United States Patent
Petrovic

(10) Patent No.: US 8,578,462 B2
(45) Date of Patent: Nov. 5, 2013

(54) METHOD AND SYSTEM FOR SECURE SESSION MANAGEMENT IN A WEB FARM

(75) Inventor: Sladjana Petrovic, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 1021 days.

(21) Appl. No.: 10/733,326

(22) Filed: Dec. 12, 2003

(65) Prior Publication Data
US 2005/0132222 A1    Jun. 16, 2005

(51) Int. Cl.
*G06F 21/00* (2013.01)

(52) U.S. Cl.
USPC .............................................. 726/9; 713/168

(58) Field of Classification Search
USPC .............................................. 713/201; 726/9
See application file for complete search history.

(56) References Cited

U.S. PATENT DOCUMENTS

| | | | | |
|---|---|---|---|---|
| 5,907,621 | A * | 5/1999 | Bachman et al. | 713/155 |
| 6,421,768 | B1 * | 7/2002 | Purpura | 711/164 |
| 7,099,946 | B2 * | 8/2006 | Lennon et al. | 709/227 |
| 2002/0124074 | A1 * | 9/2002 | Levy et al. | 709/224 |
| 2003/0005118 | A1 * | 1/2003 | Williams | 709/225 |
| 2003/0158949 | A1 * | 8/2003 | Miller et al. | 709/229 |
| 2004/0210771 | A1 * | 10/2004 | Wood et al. | 713/201 |

* cited by examiner

*Primary Examiner* — Philip Chea
*Assistant Examiner* — Carlton Johnson
(74) *Attorney, Agent, or Firm* — Ridout & Maybee LLP

(57) ABSTRACT

A system and method for secure session management in a web farm using a session token. A session management web service updates the session token with each request received from a browser. If the request must be redirected to a new server where the requested resource is located, then the decrypted session token is transmitted to the new server and the session management web service generates a new session token to be used in place of the previous session token. The new session token is transmitted to the browser with the requested web resource.

25 Claims, 2 Drawing Sheets

METHOD AND SYSTEM FOR SECURE SESSION MANAGEMENT IN A WEB FARM

FIELD OF THE INVENTION

This invention relates to session management and, more particularly, to secure platform-independent session management in a web farm.

BACKGROUND OF THE INVENTION

Under normal conditions, web servers do not attempt to recognize any relationship between separate web page requests. However, when those requests originate from the same browser, the requests may be part of a single transaction or session. When the transaction or session is intended to be secure and/or continuous, such as in the case of a commercial transaction where login and password information has been provided through the browser and product or service selections have been made through the browser from various web pages, the web server must be capable of identifying requests that come from the same browser. Session management is used to relate Hypertext Transfer Protocol (HTTP) requests originating from the same browser.

Typically, a session token is transmitted between the browser and the web server. The session token may be stored in a cookie, passed through static URLs, hidden in a web page, or otherwise communicated back and forth.

A security problem that arises with the use of session tokens is the possibility of a third party "hijacking" a session by discovering the session token and transmitting a web page request to the web server using the session token, thereby impersonating the legitimate browser.

Another problem that arises with the use of session tokens occurs in larger web server installations operating on multiple servers. The multiple servers may share resources and balance the load in a "web farm". A web farm may contain servers that run on different platforms. This presents a problem for session management in that the platforms may have different encoding techniques and a session token generated by one web server in relation to a particular web page will not necessarily be recognized by a second web server in the web farm when the browser requests a new web page that is located on the second web server.

SUMMARY OF THE INVENTION

The present invention provides a method and system for secure session management in a web farm using encrypted session tokens. The present invention maintains the session when a request is passed from a first server to a second server by decrypting the session token at the first server and passing the decrypted session token to the second server. A new session token is then created to replace the previous one and it is encrypted by the second server.

In one aspect, the present invention provides a method of secure session management for a web farm, the web farm including a first server and a second server, the second server having a requested web page. The method includes the steps of receiving, at the first server, a request for the requested web page from a browser, the request including an encrypted session token; decrypting the encrypted session token at the first server to obtain a session token; redirecting the request to the second server, including transmitting the session token to the second server; and verifying the session token.

In a further aspect, the present invention provides a system for secure session management, the system being coupled to a network and receiving a request for a requested web page from a browser via the network, the request including an encrypted session token. The system includes a first server including a first request handler for receiving the request and decrypting the encrypted session token to produce a session token; a second server including the requested web page; a common session database including stored session data; and a session management web service, accessible to the first server and the second server and including a validation component for comparing the session token with the stored session data; wherein the first request handler redirects the request to the second server and transmits the session token to the second server.

In yet a further aspect, the present invention provides a computer program product having a computer-readable medium tangibly embodying computer executable instructions for secure session management for a web farm, the web farm including a first server and a second server, the second server having a requested web page. The computer executable instructions include computer executable instructions for receiving, at the first server, a request for the requested web page from a browser, the request including an encrypted session token; computer executable instructions for decrypting the encrypted session token at the first server to obtain a session token; computer executable instructions for redirecting the request to the second server, including computer executable instructions for transmitting the session token to the second server; and computer executable instructions for verifying the session token.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which.

Similar reference numerals are used in the figures to denote similar components.

DESCRIPTION OF SPECIFIC EMBODIMENTS

It will be understood by those of ordinary skill in the art that the following description is not intended to be limited to a particular programming language, computer or network architecture, or server platform. Any limitations of the embodiments described below that arise as a result of the use of a particular programming language, computer or network architecture, or server platform are not intended as limitations of the present invention.

Figure 1:
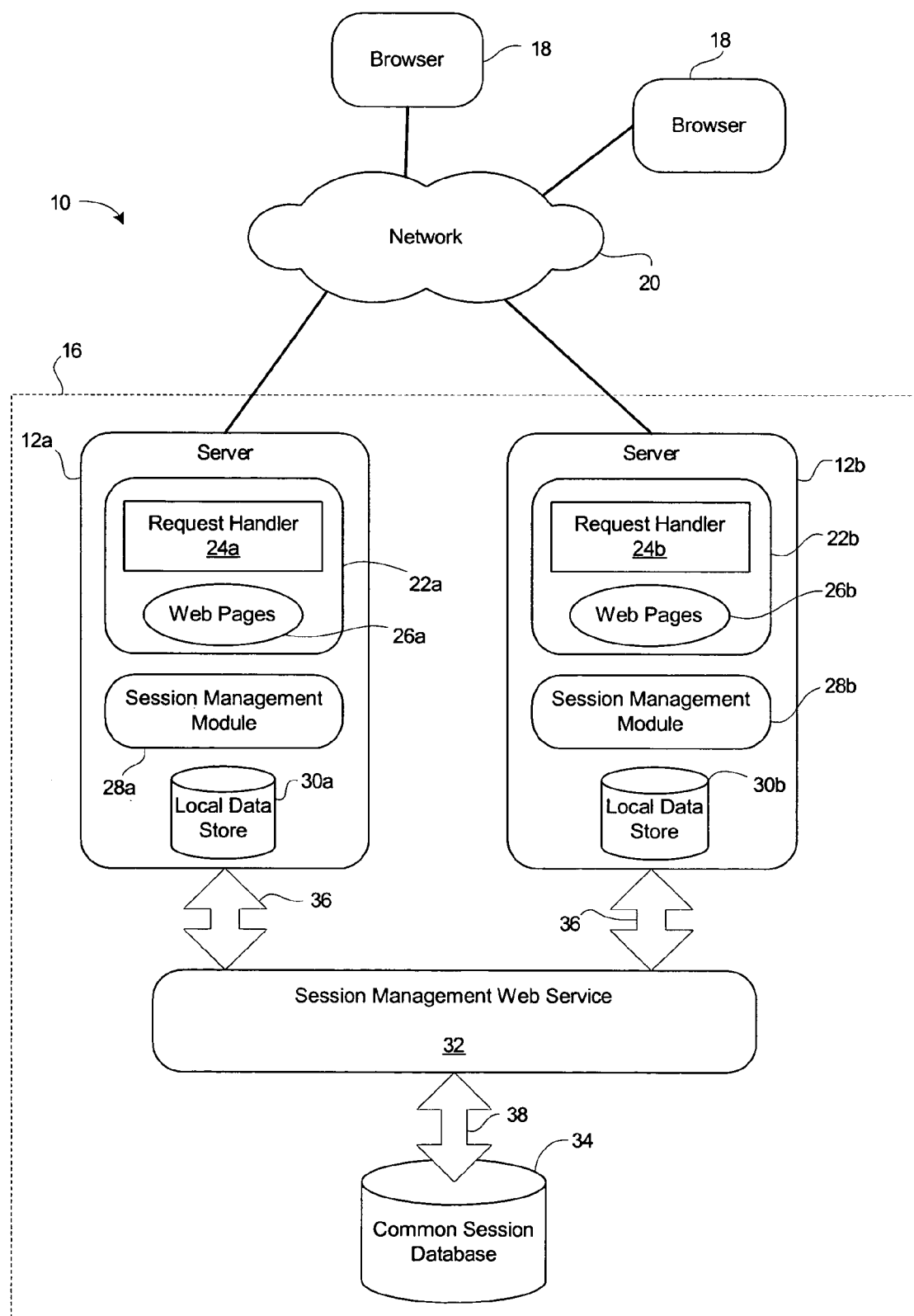
FIG. 1 shows, in block diagram form, a system for secure session management according to the present invention.

Reference is first made to FIG. 1, which shows, in block diagram form, a system 10 for secure session management. The system 10 includes a first server 12*a* and a second server 12*b*. The two servers 12 may be operating as a web farm 16. It will be appreciated that the web farm 16 need not be limited to the two servers 12 and may include additional servers.

Each of the two servers 12 operate as web servers to support a web-based service or resource. The two servers 12 are connected to a public network 20, which in one embodiment is the Internet. Also connected to the network 20 is a browser 18. The browser 18 is a web-enabled remote computer having browser software, such as Microsoft Internet Explorer™, Netscape Navigator™, Mozilla™, or others.

The servers 12 each include presentation components 22a and 22b for interacting with the browser 18, receiving requests for web pages from the browser 18, and for transmitting web pages to the browser 18. In particular, the presentation components 22 may include stored web pages 26a and 26b and a request handler 24a and 24b for receiving and processing requests for web pages 26 and for transmitting the web pages 26 to the browser 18. The web pages 26 may include HTML pages, Java Server pages, Active Server pages, and other web resources or services. The request handler 24 may include, among other things, a Common Gateway Interface (CGI), a Java servlet, or a COM object.

The first server 12a and the second server 12b may operate using different platforms. By way of example, the first server 12a may be running on the Windows Server™ platform from Microsoft Corporation and the second server 12b may be running on the Solaris™ platform from Sun Microsystems, Inc. Each platform implements a session management module 28a and 28b for managing and maintaining sessions with browsers 18 accessing the web pages 26. The session management modules 28 may store server-specific session data 30 in a local memory within the server 12. The session management module 28 performs platform-specific encryption operations to encrypt a session token. The session management module 28 then associates the encrypted session token with the requested web page 26 to communicate the session token to a browser 18. For example, the session management module 28 may embed the session token within the web page 26 prior to transmission of the web page 26 to the browser 18. In another embodiment, the session management module 28 sends the session token through a static URL. In yet another embodiment, the session management module 28 sends the session token by way of Set Cookie within an HTTP header. It will be appreciated that other mechanisms for communicating the session token to the browser 18 may be used. Although the session management modules 28 are shown as being distinct from the presentation components 22, in particular the request handler 24, it will be understood that the session management modules 28 may be incorporated within the presentation components 22, and in particular within the request handler 24.

The system 10 further includes a session management Web Service 32. The session management Web Service 32 may be implemented on one of the web servers 12 or on a separate server 12. The session management Web Service 32 provides the servers 12 with secure session management, in accordance with the present invention. In one embodiment, the session management Web Service 32 is located on the first server 12a, which also features a user authentication page among its web pages 26a.

The session management Web Service 32 interacts with the servers 12 to create, update, and remove sessions. In one embodiment, communications between the servers 12 and the session management Web Service 32 are by way of simple object access protocol (SOAP) messages 36.

The session management Web Service 32 also interacts with a common session database 34 that stores information regarding active sessions. In one embodiment, the common session database 34 is implemented using a relational database management system (RDBMS) and the session management Web Service 32 interacts with the common session database 34 using structured query language (SQL) messages 38.

The session management Web Service 32 defines a session token that includes a session ID and a timestamp. The session token comprises an XML structure that includes the session ID and the timestamp. The session ID comprises a randomly generated unique string and the timestamp comprises the time when the session is created. The session management Web Service 32 stores the session ID and associated information in the common session database 34. The associated information may include the timestamp and other session-specific information, such as last updated session time, the session type, etc.

The session management Web Service 32 is common and accessible to all of the servers 12. When a request is received by one of the server 12 that appears to have a session token, the server 12 invokes the session management Web Service 32 to manage the verification or authentication of the session token and to manage any updates or removal of sessions.

Figure 2:
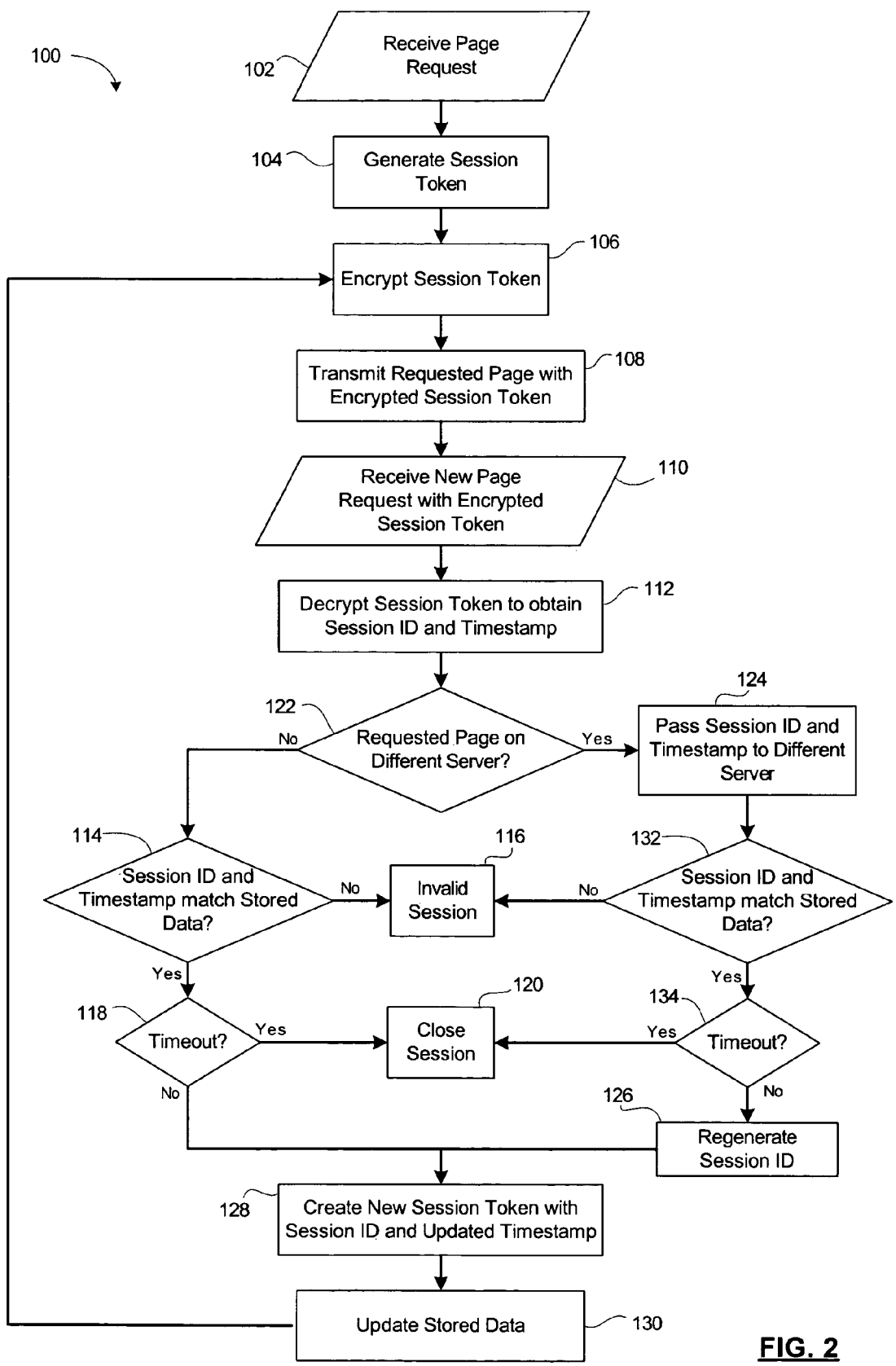
FIG. 2 shows, in flowchart form, a method of secure session management according to the present invention.

Reference is now made to FIG. 2, which shows, in flowchart form, a method 100 of secure session management.

The method 100 begins in step 102 when the first server 12a (FIG. 1) receives a page request from a browser 18 (FIG. 1). The page request may include the submission of login information, which is verified by the first server 12a to identify the user of the browser 18. It will be appreciated that various other circumstances may give rise to the desire to create a session, other than the submission of login information.

In step 104, the first server 12a invokes the session management Web Service 32 (FIG. 1) to create a session, and in response the session management Web Service 32 generates a session token. The session token comprises an XML structure that includes a session ID and a timestamp. Accordingly, the session management Web Service 32 generates the session ID. The session ID may be created through a random unique string generating process. The range and types of random string generating processes applicable for this purpose will be understood by those of ordinary skill in the art.

The timestamp may be the time at which the session is created; and it may be based upon the time clock at the first server 12a. In one embodiment, the session management Web Service 32 uses the same time clock on which to base its timestamps irrespective of which server 12 has invoked the session management Web Service 32, so as to avoid having to synchronize the servers 12.

Also in step 104, the session ID is stored in the common session database 34 (FIG. 1), along with associated information, including the timestamp.

In step 106, the local session management module 28a (FIG. 1) on the first server 12a encrypts the session token in accordance with the protocols of the platform operating on the first server 12a. The session management module 28a also embeds the encrypted session token within the response for transmission to the browser according to the protocol of the platform. This may include embedding the encrypted session token within the requested web page 26a (FIG. 1), within a static URL, within the HTTP header, or through other mechanisms. The local session management module 28a may also store server-specific session data 30 (FIG. 1) in a local memory on the first server 12a.

In step 108, the requested web page 26a is transmitted to the browser 18 by the first server 12a along with the embedded encrypted session token.

The browser 18 then, in step 110, sends a new request for a web page. The new request includes the encrypted session token. In step 112, the local session management module 28a extracts and decrypts the encrypted session token received from the browser 18.

In step 122, the first server 12a assesses whether or not the new request is for a web page 26 that is present upon the first server 12a, or whether the requested page 26 is on another server 12. If the requested page 26 is on another server 12, then the first server 12a will need to redirect the request to the correct server 12.

If the requested page 26 is on the first server 12a, then the session management Web Service 32 is invoked to verify the session. In step 114, the session management Web Service 32 obtains the session ID from the decrypted session token and searches the common session database 34 to attempt to locate an active session corresponding to the session ID. If no such session ID is found in the common session database 34, then the method 100 continues to step 116, where the session management Web Service 32 alerts the first server 12a to the fact that the session ID is invalid. This may prompt the first server 12a to transmit a warning page to the browser 18, for example advising that the new page request has been refused and that the user is required to login. Other warning and/or alarms may be generated as a result of an invalid session ID. Step 116 may include alerting an administrator to an attempted intrusion, thereby enabling an administrator to search for possible hijackers on the network.

If the session management Web Service 32 locates a matching session ID in the common session database 32, then the method 100 continues in step 118, where the elapsed time since the most recent update to the session is determined. If the time since the most recent update to the session is longer than a predetermined maximum, then the session has been inactive for too long and will be terminated. The session management Web Service 32 may read the time value stored in the common session database 34 corresponding to the session ID to assess the time at which the session was most recently updated. It may then compare that time with the current time on the first server 12a—or whichever server is hosting the session management Web Service 32—to determine the elapsed time for comparison with the predetermined maximum. If the session has timed out, then the session is closed in step 120 and the user may be notified that they are required to login again to re-establish a valid session.

If the session has not timed out, then in step 128 the session management Web Service 32 creates a new session token with an updated timestamp. The new session token contains the unchanged session ID and the updated timestamp. In step 130, the common session database is updated by the session management Web Service 32. In particular, the updated time is stored in the common session database 34 in place of the previously stored time corresponding to the session ID.

The method 100 then returns to step 106 where the local session management module 28 encrypts the new session token and embeds it in the requested web page 26. In step 108, the requested web page 26 is transmitted to the browser 18 with the encrypted new session token.

If, in step 122, it is determined that the requested web page 26 requires redirection to the second server 12b (FIG. 1), then, in step 124, the session ID and timestamp are passed to the second server 12b. The second server 12b has its own local session management module 28b (FIG. 1) that implements its own encryption process, which may be different from the encryption process used by the first server 12a. The second server 12b cannot be presumed to be able to decrypt the session token so as to obtain the session ID and timestamp. Therefore, the session ID and timestamp are provided directly to the second server 12b so that it recognizes that the request is related to an active session. In order to minimize the security risks associated with directly communicating the session ID, the session ID is then regenerated in subsequent steps in the method 100.

In one embodiment, the session ID and timestamp are communicated to the second server 12b by the first server 12a using URL query string. For example, the first server 12a may rewrite the URL to include the session ID in unencrypted clear text form, such as "session ID=823sjfw8ru93u". The timestamp may be communicated to the second server 12b in a similar manner. It will be understood that other embodiments may employ other methods of communicating the session ID and timestamp from the first server 12a to the second server 12b.

Once the request is redirected to the second server 12b, and the second server 12b is passed the session ID associated with the request and the timestamp, the session management Web Service 32 is invoked by the second server 12b. The session management Web Service 32 then determines whether the session is valid by searching the common session database 32 for the session ID and timestamp in step 132. If the session ID and corresponding timestamp cannot be located, then the method 100 proceeds to step 116 to generate the appropriate action or alarm. In step 134, the timestamp passed to the second server 12b is assessed to determine whether the session has timed out. For example, the timestamp may be compared with the current time on the server hosting the session management Web Service 32 to determine if the elapsed time exceeds a predetermined maximum. If so, then the session is closed in step 120.

If the session ID is valid and the session has not timed out, then in step 126, the session management Web Service 32 generates a new session ID. In step 128, the session management Web Service 32 creates a new session token for the second server 12b that contains the new session ID and an updated timestamp. The session management Web Service 32 then updates the common session database 34 in step 130 to overwrite the previous session ID with the new session ID and to update the time information. The method 100 then loops back to step 106, where the session management module 28b at the second server 12b encrypts and embeds the new session token prior to sending the requested web page 26b to the browser 18 in step 108.

Although the foregoing description refers to the session management Web Service 32 as being based upon SOAP communications and employing XML structures, it will be understood by those of ordinary skill in the art that other protocols may be used to achieve the same effect, provided the protocols are platform-independent. Accordingly, references to the session management Web Service 32 include any platform-independent module, object, or other service for performing the functions and steps described above.

It will also be appreciated by those of ordinary skill in the art that some of the steps of the method 100 may be performed in a different order without materially affecting the essential characteristics of the invention.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of secure session management for a web farm, the web farm including a first server and a second server, the second server having a requested web page, the method comprising:
   at the first server:
      receiving a request for the requested web page from a browser, said request including an encrypted session token associated with a session;
      decrypting said encrypted session token at the first server to obtain a session ID and a timestamp;
      transmitting a redirect message, said redirect message prompting transmission of said request to the second server;
      in conjunction with said transmitting said redirect message, transmitting said session ID and said timestamp directly to the second server;
   at the second server:
      receiving said request;
      receiving said session ID and said timestamp from said first server;
      verifying said session;
      generating a new session ID;
      updating the timestamp to produce an updated timestamp;
      creating a new session token, wherein the new session token includes the new session ID and the updated timestamp;
      encrypting the new session token to produce a new encrypted session token; and
      transmitting a response to the browser from the second server, wherein the response includes the new encrypted session token.

2. The method claimed in claim 1, further including updating a common session database by replacing said session ID and said timestamp with said new session token in said common session database.

3. The method claimed in claim 1, wherein a common session database contains a stored session ID and a stored timestamp, and wherein said verifying includes comparing said session ID and said timestamp with said stored session ID and said stored timestamp.

4. The method claimed in claim 1, further including determining whether said session has timed out, said step of determining including determining an elapsed time between said timestamp and a current server time, and comparing said elapsed time with a predetermined maximum time to determine whether said session has timed out.

5. The method claimed in claim 4, including closing said session if said session has timed out.

6. The method claimed in claim 1, wherein said transmitting includes incorporating said session ID and said timestamp into a URL.

7. The method claimed in claim 1, wherein a session management web service performs said verifying, said session management web service being accessible to said first server and said second server, and wherein said verifying includes comparing said session ID and said timestamp with stored session data.

8. The method claimed in claim 7, wherein the web farm further includes a common session database containing said stored session data.

9. The method claimed in claim 1, wherein said requested web page includes a web resource selected from the group including an applet, an HTML page, a Java server page, and an Active server page.

10. A system for secure session management, the system being coupled to a network and receiving a request for a requested web page from a browser via the network, the request including an encrypted session token, the system comprising:
   a first server including a memory and a first request handler adapted to:
      receive the request; and
      decrypt the encrypted session token to produce a session ID and a timestamp;
   a second server including the requested web page;
   a common session database including stored session data; and
   a session management web service, accessible to said first server and said second server and including:
      a validation component for comparing said session ID and said timestamp with said stored session data;
      a token generator adapted to:
         generate a new session ID;
         update the timestamp, based upon a current server time, to produce an updated timestamp; and
         create a new session token for the second server, wherein the new session token includes the new session ID and the updated timestamp;
   the second server including a second request handler adapted to:
      encrypt the new session token to produce a new encrypted session token; and
      transmit a response to the browser, wherein the response includes the new encrypted session token;
   said first request handler adapted to:
      transmit a redirect message, the redirect message prompting transmission of said request to said second server; and
      transmit the session ID and said timestamp directly to said second server.

11. The system claimed in claim 10, wherein said session management web service replaces said session ID and said timestamp within said common session database with said new session token.

12. The system claimed in claim 10, wherein said stored session data includes a stored session ID and a stored timestamp, and wherein said validation component compares said session ID and said timestamp with said stored session ID and said stored timestamp.

13. The system claimed in claim 10, wherein said validation component further determines an elapsed time between said timestamp and a current server time, and compares said elapsed time with a predetermined maximum time to determine whether a session has timed out.

14. The system claimed in claim 10, wherein said session management web service closes said session if said validation component indicates said session has timed out.

15. The system claimed in claim 10, wherein said first request handler incorporates said session ID and said timestamp into a URL in order to transmit said session token to said second server.

16. The system claimed in claim 10, wherein the requested web page includes a web resource selected from the group including an applet, an HTML page, a Java server page, and an Active server page.

17. A non-transitory computer program product having a computer-readable medium tangibly embodying computer executable instructions for secure session management for a web farm, the web farm including a first server and a second server, the second server having a requested web page, the computer executable instructions including:

computer executable instructions causing the first server to:
- receive a request for the requested web page from a browser, said request including an encrypted session token associated with a session; decrypt the encrypted session token to obtain a session ID and a timestamp;
- transmit a redirect message, said redirect message prompting transmission of said request to the second server;
- transmit the session ID and said timestamp directly to the second server;

computer executable instructions causing the second server to:
- receive said request;
- receive the session ID and said timestamp from said first server;
- verify the session;
- generate a new session ID;
- update the timestamp to produce an updated timestamp;
- create a new session token, wherein the new session token includes the new session ID and the updated timestamp;
- encrypt the new session token to produce a new encrypted session token; and
- transmit a response to the browser, wherein the response includes the new encrypted session token.

18. The non-transitory computer program product claimed in claim 17, wherein the computer executable instructions further cause the second server to update a common session database by replacing said session ID and said timestamp with said new session token in said common session database.

19. The non-transitory computer program product claimed in claim 17, wherein a common session database contains a stored session ID and a stored timestamp, and wherein said computer executable instructions further cause the second server to compare the session ID and said timestamp with said stored session ID and said stored timestamp.

20. The non-transitory computer program product claimed in claim 17, wherein the computer executable instructions further cause the second server to determine whether said session has timed out by determining an elapsed time between said timestamp and a current server time, and comparing said elapsed time with a predetermined maximum time to determine whether said session has timed out.

21. The non-transitory computer program product claimed in claim 20, wherein the computer executable instructions further cause the second server to close the session if said session has timed out.

22. The non-transitory computer program product claimed in claim 17, wherein said computer executable instructions further cause the second server to incorporate the session ID and said timestamp into a URL.

23. The non-transitory computer program product claimed in claim 17, wherein the computer executable instructions for verifying cause the second server to verify the session comprise a session management web service, said session management web service being accessible to said first server and said second server, and wherein said computer executable instructions further cause the second server to compare the session ID and said timestamp with stored session data.

24. The non-transitory computer program product claimed in claim 23, wherein the web farm further includes a common session database containing said stored session data.

25. The non-transitory computer program product claimed in claim 17, wherein said requested web page includes a web resource selected from the group including an applet, an HTML page, a Java server page, and an Active server page.

* * * * *